US011860080B2

(12) United States Patent
Nelson et al.

(10) Patent No.: US 11,860,080 B2
(45) Date of Patent: Jan. 2, 2024

(54) SYSTEM FOR MONITORING PARTICLES SUSPENDED IN FLUID STREAM

(71) Applicants: Rolls-Royce Corporation, Indianapolis, IN (US); Rolls-Royce PLC, London (GB)

(72) Inventors: Scott Nelson, Indianapolis, IN (US); Taylor K. Blair, Indianapolis, IN (US); John Grubbs, Indianapolis, IN (US); Martyn Anthony Jones, London (GB); Chris Heason, London (GB)

(73) Assignees: Rolls-Royce Corporation, Indianapolis, IN (US); Rolls-Royce plc, London (GB)

( * ) Notice: Subject to any disclaimer, the term of this patent is extended or adjusted under 35 U.S.C. 154(b) by 202 days.

(21) Appl. No.: 17/564,489

(22) Filed: Dec. 29, 2021

(65) Prior Publication Data

US 2023/0204490 A1    Jun. 29, 2023

(51) Int. Cl.
*G01N 15/14*    (2006.01)

(52) U.S. Cl.
CPC ..... *G01N 15/1463* (2013.01); *G01N 15/1459* (2013.01); *G01N 2015/1495* (2013.01); *G01N 2015/1497* (2013.01)

(58) Field of Classification Search
CPC .......... G01N 15/1463; G01N 15/1459; G01N 2015/1495; G01N 2015/1497; G01N 2015/0026; G01N 2015/0046; G01N 2015/1493
See application file for complete search history.

(56) References Cited

U.S. PATENT DOCUMENTS

2021/0046708 A1* 2/2021 Riede ..................... B22F 12/44

OTHER PUBLICATIONS

U.S. Appl. No. 17/932,945, filed Sep. 16, 2022, naming inventors Nelson et al.
Brown et al., "Insights into Powder Flow Characterization Methods for Directed Energy Distribution Additive Manufacturing Systems," Solid Freeform Fabrication 2018: Proceedings of the 29th Annual International Solid Freeform Symposium - An Additive Manufacturing Conference, Aug. 2018, 13 pp.
Melo, "Powder jet particle density distribution analysis and qualification for the laser metal deposition process," Dissertation Universidade Federal de Santa Catarina, retrieved from https://repositorio.ufsc.br/xmlui/handle/123456789/171441, Florianopolis, Dec. 2016, 134 pp.

(Continued)

*Primary Examiner* — Roy M Punnoose
(74) *Attorney, Agent, or Firm* — Shumaker & Sieffert, P.A.

(57) ABSTRACT

In some examples, a system including a fluid stream monitoring system. The monitoring system includes an illumination device configured to illuminate at least some of particles suspended in a fluid stream; and an imaging device configured to image the illuminated particles at a first image plane that intersects a longitudinal axis of the fluid stream, wherein the illumination device and the imaging device are registered to the fluid stream delivery device in the first image plane, where the first image plane is substantially orthogonal to the longitudinal axis. The system includes processing circuitry configured to determine one or more physical characteristics of the fluid particles.

20 Claims, 6 Drawing Sheets

(56) References Cited

OTHER PUBLICATIONS

Balu et al., "Parametric study on a coaxial multi-material powder flow in laser-based powder deposition process", Journal of Materials Processing Technology, vol. 212, No. 7, Feb. 2012, pp. 1598-1610.

Garcia-Moreno et al., "A new PIV method to measure powder flow velocity in laser metal deposition: an Eulerian-based approach", The International Journal of Advanced Manufacturing Technology, vol. 117, No. 5-6, Aug. 2021, pp. 1825-1841.

Riede, "Formnext 2019: Fraunhofer IWS presents COAXshield and LIsec AM systems", Optics.org, Nov. 2019, 3 pp., Retrieved from the Internet on Jan. 18, 2023 from URL: https://optics.org/news/10/11/29.

Riede, "LIsec: Systems Integrated Powder Nozzle Measuring System for Additive Manufacturing Applications", Fraunhofer, Nov. 2019, 2 pp., Retrieved from the Internet on Jan. 18, 2023 from URL: https://www.iws.fraunhofer.de/content/dam/iws/en/documents/publications/product_sheets/600-10_pulverduesenmessystem_en.pdf.

Sdvizhenskii et al., "Online laser-induced breakdown spectroscopy for metal-particle powder flow analysis during additive manufacturing," Journal of Analytical Atompic Spectrometry, Issue 2, No. 25, Royal Society of Chemistry, Dec. 2, 2019, pp. 246-253.

\* cited by examiner

SYSTEM FOR MONITORING PARTICLES SUSPENDED IN FLUID STREAM

TECHNICAL FIELD

This disclosure relates to monitoring fluidized particle-based techniques.

BACKGROUND

Several industrial manufacturing techniques propel fluidized particles (e.g., particles entrained in a fluid stream) against a target surface for various applications. Other techniques generate streams of particles. The streams of particles may be solid or liquid particles suspended in a fluid (e.g., a gas or liquid). It may be difficult to characterize flow patterns of the particles within the particle stream.

SUMMARY

In some examples, the disclosure describes a system comprising a fluid stream delivery device, a fluid stream monitoring system comprising an illumination device and an imaging device, and processing circuitry. The fluid stream delivery device may be configured to expel a fluid stream onto a target surface, where the fluid stream comprises particles suspended in a fluid. The illumination device may be configured to illuminate at least some of the particles suspended in the fluid stream between the fluid stream delivery device and the target surface. The imaging device may be configured to image the illuminated particles at an image plane that intersects a longitudinal axis of the fluid stream, wherein the illumination device and the imaging device are registered to the fluid stream output device in a first image plane, where the first image plane is substantially orthogonal to the longitudinal axis. The processing circuitry may be configured to determine one or more physical characteristics of the imaged particles.

In some examples, the disclosure describes a method comprising expelling a fluid stream comprising particles suspended in a fluid onto a target surface using a fluid stream delivery device. An illumination device of a fluid stream monitoring system then illuminates at least some of the particles suspended in the fluid stream between the fluid stream delivery device and the target surface. An imaging device of the fluid stream monitoring system then images the illuminated particles at an image plane that intersects a longitudinal axis of the fluid stream. Processing circuitry may then determine one or more physical characteristics of the imaged particles. The illumination device and the imaging device may be registered to the fluid stream delivery device in a first image plane, where the first image plane is substantially orthogonal to the longitudinal axis.

The details of one or more examples are set forth in the accompanying drawings and the description below. Other features, objects, and advantages will be apparent from the description and drawings, and from the claims.

DETAILED DESCRIPTION

This disclosure generally describes techniques and systems for measuring particle flow for particles suspended in a fluid stream, e.g., between a fluid stream delivery device and a target surface during an industrial manufacturing technique, such as, but is not limited to, abrasive blasting (e.g., grit blasting), shot peening, cold spraying, plasma spray coating, powder production, atomizing techniques, waterjet cutting, paint spraying, machining applications, machining fluid applications, or the like. The techniques and systems of this disclosure may also be applied to other uses involving particles suspended in a fluid stream, such as for powder manufacturing or fluid dynamics computation techniques (such as measuring particle flow within a gas turbine engine). Example fluid stream monitoring systems (FSMS) may include an optical system that includes an illumination device and an imaging device. The illumination device and imaging device may work together to image at least a portion of the particles suspended in the fluid stream. A computing device may analyze the image to determine a number of particle detections in each image and may convert the number of particle detections to particle mass flow or particle mass flow rate, e.g., using a calibration curve. The computing device may be configured to output a representation of the particle flow in any one or more of a variety of formats. For example, the computing device may be configured to output a number representing the detections or mass flow (e.g., a numerical mass flow rate in, for example, milligrams per mate or other appropriate units), a graphical representations of detections per unit time or mass flow per unit time, a graphical representation of detections or mass flow as a function of position (e.g., axial position and/or position within the image plane), or the like.

Additionally, or alternatively, the computing device may be configured to determine one or more fluid flow delivery system characteristics based on the images. For instance, based on the particle flow distribution, the computing device may be configured to identify a damaged fluid flow delivery device nozzle, a clog within a fluid flow delivery device nozzle, a worn or damaged tool, or the like.

In some implementations, the computing device may be configured to control the industrial manufacturing technique based on the image data. For instance, upon detecting a clog, the computing device may be configured to cause a fluid stream delivery device to be cleaned, e.g., using a temporary high flow rate of fluid through the fluid stream delivery device, through mechanical cleaning of the fluid stream delivery device, or the like. As another example, the computing device may be configured to compare a measured parameter, such as a measured particle detections, a measured mass flow rate, a measured detection or mass flow distribution, or the like to a setpoint or set range. Upon determining that the measured parameter deviates from the setpoint or set range, the computing device may control one or more process variables (e.g., mass flow of particle from a particle source, process fluid flow rate, or the like) and re-measure the measured parameter until computing device determines that the measured parameter satisfies the setpoint or the set range.

In other implementations, the computing device may be configured to determine one or more physical characteristics of the detected particles based on the images. For instance, based on the images, the computing device may be configured to identify the physical morphology of the particles and determine whether the measured morphology deviates from a pre-established morphology tolerance. In other examples, the computing device may be configured to determine the velocity of the particles and the focus of the fluid stream based on the particle flow distribution.

A FSMS may include an illumination device, such as a laser, and an imaging device. The laser is configured to illuminate a plane of the particle stream (e.g., a plane substantially perpendicular to an axis extending between the fluid stream deliver device and the target surface). The imaging device is configured to image the illuminated powder. The imaging device may have a relatively-high data acquisition speed (e.g., frame rate), such greater than 1000 Hz. Because of the velocity of the particles in the fluid stream, even such a frame rate may image only a fraction of the powder flowing between the fluid stream delivery device and the target surface.

In some examples, the FSMS also includes a housing configured to enclose the illumination device and/or the imaging device. The housing may be configured to protect the illumination device and the imaging device from damage due to the harsh conditions to which the FSMS will be exposed during use. For example, the housing may protect the illumination device and the imaging device from particle deflections, may cool the illumination device and the imaging device to remove heat from the illumination device and/or the imaging device, or the like. In other examples, the housing may be configured to include filters over the illumination device and/or imaging device to reduce the effects of the luminosity of light sources from the manufacturing techniques (e.g., plasma flames during plasma spray coating).

By including a FSMS as described herein and/or using the analysis techniques described herein, understanding and/or control of the particle stream in the industrial manufacturing techniques may be improved. This may allow for more efficient application of the techniques and for more precise application of the fluid streams onto the target surfaces, or the like.

Figure 1:
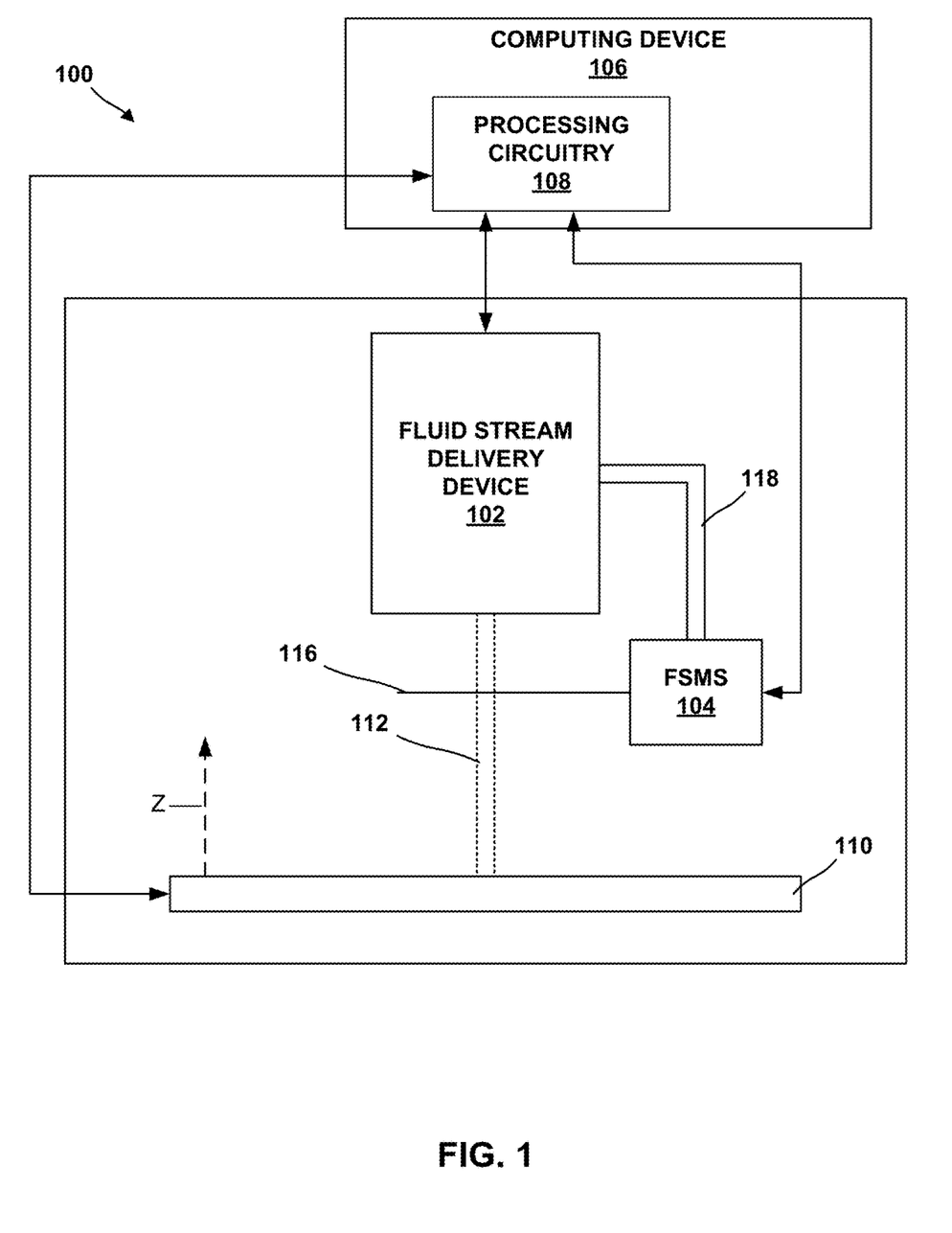
FIG. 1 is a conceptual block diagram illustrating an example fluid stream monitoring system that includes a fluid stream monitoring device configured to monitor particle flow in a fluid stream between a fluid stream delivery device and a target surface.

FIG. 1 is a conceptual block diagram illustrating an example system 100 for performing an industrial manufacturing technique using fluid streams containing suspended particles, such as abrasive blasting, shot peening, cold spray coating, and plasma spray coating. The industrial manufacturing technique may be configured to alter one or more characteristics of a target (e.g., target surface 110). The one or more characteristics may include the roughness, thickness, cleanliness, and stress level of target surface 110. In some examples, the industrial manufacturing technique may use the fluid streams containing suspended particles to smooth out and reduce the roughness of target surface 110, e.g., through abrasive blasting. In other examples, the industrial manufacturing technique may use a fluid stream containing suspended particles to reduce the overall thickness or the thickness of a portion of target surface 110, e.g., by removing material from target surface 110 using the fluid stream. In other examples, the industrial manufacturing technique may use a fluid stream containing suspended particles to increase the stress level within target surface 110, e.g., through shot peening techniques.

System 100 includes a fluid stream monitoring system (FSMS) 104 for measuring particle flow between fluid stream delivery device 102 and target surface 110 during the industrial manufacturing technique. In the example illustrated in FIG. 1, system 100 performing the industrial manufacturing technique includes a computing device 106, fluid stream delivery device 102, FSMS 104, and target surface 110. Computing device 106 is operably connected to fluid stream delivery device 102 and FSMS 104 and includes processing circuitry 108. The processing circuitry 108 may be configured to determine one or more of the characteristics disclosed herein using data from FSMS 104.

Computing device 106 is configured to control components of system 100 and may include, for example, a desktop computer, a laptop computer, a workstation, a server, a mainframe, a cloud computing system, or the like. Computing device 106 is configured to control operation of system 100, including, for example, fluid stream delivery device 102, FSMS 104, and/or target surface 110. Computing device 106 may be communicatively coupled to fluid stream delivery device 102, FSMS 104, and/or target surface 110 using respective communication connections. In some examples, the communication connections may include network links, such as Ethernet, ATM, or other network connections. Such connections may be wireless and/or wired connections. In other examples, the communication connections may include other types of device connections, such as USB, IEEE 1394, or the like.

Although FIG. 1 illustrates a single computing device 106 and attributes all control and processing functions to that single computing device 106, in other examples, system 100 may include multiple computing devices 106, e.g., a plurality of computing devices 106. In general, control and processing functions described herein may be divided among one or more computing devices. For instance, system 100 may include controller for fluid stream delivery device 102 and target surface 110, a separate controller for FSMS 104, and a separate computing device for analyzing data obtained by FSMS 104. As another example, system 100 may include a dedicated controller for each of fluid stream delivery device 102, target surface 110, and/or FSMS 104 and analyzing data obtained by FSMS 104. Other examples of computing system architectures for controlling system 100 and analyzing data obtained from system 100 will be apparent and are within the scope of this disclosure.

Computing device 106 may be configured to control operation of fluid stream delivery device 102, FSMS 104, and/or target surface 110 to position target surface 110 relative to fluid stream delivery device 102 and/or FSMS 104. For example, target surface 110 is movable relative to the fluid stream delivery device 102 and/or the fluid stream delivery device 102 is movable relative to target surface 110. Computing device 106 may control target surface 110, fluid stream delivery device 102 and/or one or more components of FSMS 104 to translate and/or rotate along at least one axis to position target surface 110 relative to fluid stream delivery device 102 and/or FSMS 104. For example, target surface 110 may be translatable and/or rotatable along at least one axis to position the target surface 102 relative to fluid stream delivery device 102. Similarly, the fluid stream delivery device 102 may be translatable and/or rotatable along at least one axis to position fluid stream delivery device 102 relative to the target surface 102.

Fluid stream delivery device 102 may be configured to deliver particles to selected locations of target surface 110 via a fluid stream 112. Fluid stream delivery device 102 may include one or more nozzles that each output particles suspended in fluid stream 112. In some examples, fluid stream delivery device 102 includes a single nozzle, which may be a point nozzle, or a single nozzle that is an annular channel. In other example, fluid stream delivery device 102 includes a plurality of nozzles (e.g., three nozzles or four nozzles). shot peening, waterjet cutting, cold spraying, thermal spraying (e.g., plasma spraying), paint spraying, fuel nozzle spray characterization, powder production, atomization techniques, machining fluid characterization.

Fluid stream delivery device 102 may include any components used for any of the fluidized particle techniques disclosed herein. For example, fluid stream delivery device 102 may include a nozzle configured to output fluid stream 112 to ablatively blast the target surface 110 (e.g., in a grit blasting process). In another example, fluid stream delivery device 102 may include a thermal spray gun (e.g., a plasma spray gun), which may include a nozzle configured to output fluid stream 112 and a flame or plasma source component configured to heat particles to soften or melt in order to apply a thermally sprayed coating over the target surface 110. In other examples, fluid stream delivery device 102 may include a shot peening device, a waterjet cutting device, cold spraying device, a paint spraying device, fuel nozzle, a powder production device, an atomization device, a machining fluid nozzle, or the like. Regardless of the number of nozzles or additional components fluid stream delivery device 102 may output a fluid stream 112 in which the particles are suspended in fluid stream 112. In some examples, fluid stream 112 is focused at a focus plane. In other examples, fluid stream 112 may not be focused.

In some examples, system 100 may not include fluid stream delivery device 102. For instance, FSMS 104 may be used to sense flow of particles generated by a process, in which the process does not include a fluid stream delivery device 102. For instance, FSMS 104 may be used to sense particles entrained within a fluid flow within an engine. As an example, sand or dust may be entrained in an inlet airflow to a gas turbine engine. The sand or dust may have deleterious effects on components of the gas turbine engine, e.g., due to erosion of components on which the sand or dust impacts, due to melting of the sand or dust and physical or chemical damage to coatings due to the molten sand or dust, or the like. Thus, it may be beneficial to understand flow patterns of the sand or dust particles within the gas turbine engine in order to help design mitigation strategies (e.g., resistant coatings, purge streams, or the like) for sand or dust ingestion. As another example, some machining operations, such as cutting or grinding, generate material chips from the material being worked. FSMS 104 may be used to sense particles (e.g., material chips) generated by the machining technique to help monitor the cutting operation. In some examples, FSMS 104 may be used to characterize the particles (e.g., material chips) generated by the machining technique, which may provide information regarding a state of the machining tool, the material being worked, or the like.

In accordance with techniques of this disclosure, system 100 includes a fluid stream monitoring system FSMS 104. FSMS 104 is configured to image at least a portion of fluid stream 112 to detect and/or measure at least a portion of particles suspended in fluid stream 112. In examples that include fluid stream delivery device 102 and target surface 110, FSMS 104 may be configured to detect and/or measure at least a portion of particles suspended in fluid stream 112 flowing between fluid stream delivery device 102 and target surface 110. In examples, that do not include fluid stream delivery device 102 and/or target surface 110, FSMS 104 may be configured to detect and/or measure at least a portion of particles suspended in fluid stream 112 at any position of the fluid stream 112. FSMS 104 may include an illumination device and an imaging device.

In some examples, the illumination device may include one or more light source. For instance, the illumination device may include one or more structured light devices, such as one or more lasers. The illumination device is configured to illuminate a plane of fluid stream 112 at image plane 116, e.g., a plane substantially perpendicular to an axis (Z-axis) extending between fluid stream delivery device 102 and target surface 110. In some examples, the illumination device may be configured to deliver a laser in pulses.

The imaging device of FSMS 104 is configured to image at least some of the illuminated powder. The imaging device may have a relatively high data acquisition speed (e.g., frame rate) such as at around 1000 Hz. In other examples, the acquisition speed may be greater than 1000 Hz. Because of the velocity of the particles in fluid stream 112, only a fraction of the particles may be captured, even at higher frame rates.

In some examples, FSMS 104 also includes a housing configured to enclose the illumination device and the imaging device. The housing may be configured to protect the illumination device and the imaging device from damage due to the harsh conditions to which FSMS 104 may be exposed during use. For example, the housing may protect the illumination device and the imaging device from particle deflections from fluid stream 112 off of target surface 110, may cool the illumination device and the imaging device to remove heat incident on FSMS 104 from fluid stream delivery device 102, reduce luminosity from fluid stream delivery device 102, or the like.

FSMS 104 may be positionally fixed relative to fluid stream delivery device 102 in the x-y plane shown in FIG. 1. This may help maintain a relative x-y position of FSMS 104 and the image plane 116 of the imaging device relative to fluid stream 112. This may facilitate analysis of image data captured by the imaging device.

FSMS 104 may be movable in the z-axis direction of FIG. 1. This may enable movement of image plane 116 along the z-axis of FIG. 1. This may allow FSMS 104 to image fluid stream 112 at different positions between fluid stream delivery device 102 and target surface 110. In this way, FSMS 104 may analyze fluid stream 112 along fluid stream 112 to help determine parameters of fluid stream 112 along its length.

In some examples, target surface 110 may include any material and/or component on which the industrial manufacturing technique is currently performed. For example, a target surface 110 for an ablative blasting technique performed by system 100 may be a piece of unfinished metal. In other examples, the target surface 110 may include a mounting surface for the material and/or component to be treated with the industrial manufacturing technique. In other examples, the target surface 110 may include one or more collection devices configured to collect the output of the manufacturing technique (e.g., to collect powder from a powder manufacturing process). In some examples, the target surface 110 may be a reference plane at a certain distance away from fluid stream delivery device 102 when the system 100 is used to test certain fluid dynamics characteristics.

In some examples, FSMS 104 may be positionally fixed relative to fluid stream delivery device 102 in the x-y plane shown in FIG. 1 and movable parallel to a longitudinal axis extending from fluid stream delivery device 102 to target surface 110 by an adjustable z-stage 118. Adjustable z-stage 118 may be attached to fluid stream delivery device 102 or a portion of system 100 that moves fluid stream delivery device 102, such that FSMS 104 moves in the x-y axis in registration with fluid stream delivery device 102.

Adjustable z-stage 118 may be controlled by computing device 106 to position GSMS 104 and image plane 116 relative to fluid stream 112. Further computing device 106 may control adjustable z-stage 118 to move FSMS 104 vertically and out of the way to allow fluid stream delivery device 102 access to physically retrained areas.

Figure 2:
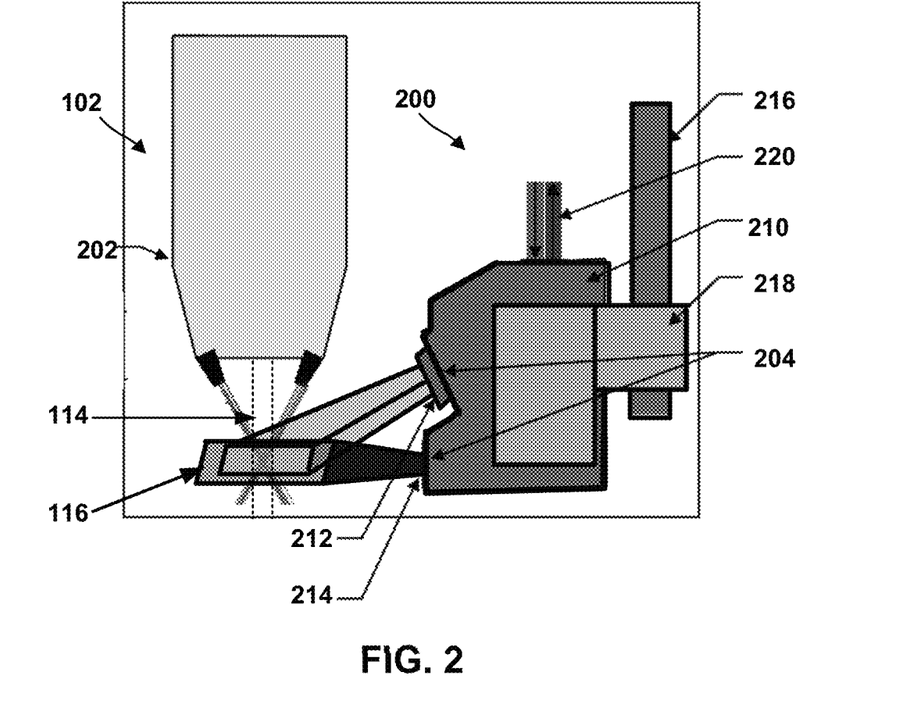
FIG. 2 is a conceptual and schematic diagram illustrating an example fluid stream monitoring system configured to monitor particle in a fluid stream between a fluid stream delivery device and a target surface.

FIG. 2 is a conceptual and schematic diagram illustrating an example particle measuring system 200 configured to monitor particles in a fluid stream between a fluid stream delivery device 102 and a target surface (not pictured).

Fluid stream delivery device 102 includes a nozzle 202. In some examples, fluid stream delivery device 102 may include a plurality of nozzles 202. The nozzle 202 outputs a fluid stream 114 towards the target surface (not pictured). As shown in FIG. 2, the fluid stream 114 may be focused at a focal plane 116, such that the fluid stream 114 is converging toward the focal plane and diverging away from the focal plane. In other examples, the fluid stream 114 may be configured such that the fluid stream 114 is continually converging toward or diverging away from the target surface.

FSMS 104 includes a housing 210 (also referred to as an enclosure), which encloses an imaging device 212 and an illumination device 214. In some examples, imaging device 212 may be a high-speed camera and illumination device 214 may be a laser illuminator. Housing 210 is attached to an adjustable z-stage 216 by bracket 218.

Housing 210 is configured to enclose imaging device 212 and illumination device 214 from a surrounding environment. For instance, housing 210 may be configured to surround imaging device 212 and illumination device 214 and prevent any particles that reflects from the target surface towards FSMS 104 from impacting imaging device 212 and illumination device 214.

Further, housing 210 may be configured to cool imaging device 212 and illumination device 214. Imaging device 212 and illumination device 214 may be exposed to heat, energy, and/or light from the rest of system 100 (e.g., fluid stream delivery device 102, target surface 110). Imaging device 212 and illumination device 214 may be relatively sensitive to heat, energy, and/or light and have improved operational lifetime and improved results if operated below certain thresholds. FSMS may include a cooling system 220 to remove heat from within housing 210 to cool imaging device 212 and illumination device 214. In some examples, housing 210 may be formed from a material having relatively high thermal conductivity, such as aluminum, to help transfer heat from within housing 210 to cooling system 220.

The construction of housing 210 and cooling system 220 may depend at least in part, on the environment in which FSMS 104 is to be used. For instance, when FSMS 104 is used in an abrasive blasting (e.g., grit blasting technique), the abrasive media may possess high kinetic energy and may deflect or ricochet off target surface 110 toward housing 210. As such, housing 210 may possess sufficient mechanical strength to protect imaging device 212 and illumination device 214 from the abrasive media. Similar concerns may exist for show peening, cold spray, waterjet cutting, and the like. As another example, when FSMS 104 is used in a thermal spraying technique, an atomization technique, a powder production technique, or the like, FSMS 104 may be exposed to relatively high temperatures. As such, cooling system 220 may be configured to remove sufficient heat to maintain imaging device 212 and illumination device 214 below selected temperature thresholds.

In some examples, housing 210 may be configured to position, orient, and allow light to pass through to or from imaging device 212 and illumination device 214, respectively. In other examples, housing 210 may be configured to control the amount of light passing through to or from imaging device 212, and illumination device 214, respectively. For example, housing 210 may include one or more apertures or view ports through which light can pass. In some examples the apertures or view ports may be filled with a material 204 that is substantially transparent to wavelengths of interest, e.g., wavelengths of illumination device 212. Additionally or alternatively, the apertures or view ports may be filled with a material 204 that is not substantially transparent to at least some other wavelengths. The material 204 that fills the apertures or view ports may act as a filter to attenuate or remove unwanted wavelength while passing wavelengths associated with FSMS 104.

For instance, FSMS 104 may be used in high temperature or highly energetic processes in which it is desirable to filter light of certain wavelengths (e.g., infrared wavelengths) to enable better or more accurate sensing of light from illumination device 214. As examples, thermal spraying, powder production, atomization techniques, or the like may include a plasma, flame, or other heat source that may be filtered to allow better or more accurate sensing of light from illumination device 214 by imaging device 212.

As described above, FSMS 104 may be configured to measure particle flow of fluid stream 114 at one or more axial (or longitudinal) positions of fluid stream 114 and determine one or more parameters associated with the particle flow. For instance, illumination device 214 may illuminate particles of fluid stream 114 in a plane oriented substantially orthogonal to a longitudinal axis that extend from fluid stream delivery device 102 to the target surface 110. FSMS 104 may be positioned at a selected axial or longitudinal location to image a select axial or longitudinal position between fluid stream delivery device 102 and the target surface 110. Imaging device 212 may be configured to image at least some of the illuminated particles. FIG. 2 is a conceptual diagram illustrating an example of portions of a fluid stream imaged by a fluid stream monitoring system.

While FIG. 2 shows one FSMS 104, other examples may include multiple FSMS 104, e.g., connected to the fluid stream delivery device 102 or positioned at a plurality of locations relative to fluid stream 114. In some examples, computing device 106 may operate each FSMS 104 individually. In other examples, computing device 106 may operate the multiple FSMS 104 in conjunction. The multiple FSMS 104 may be oriented at different image planes. In other examples, the multiple FSMS 104 may be oriented at the same image plane.

As an example, some fluid stream processes, such as atomization techniques, machining processes (e.g., grinding, milling, lathes, or the like) may produce particles (e.g., solid or liquid particles) with a radial or circumferential flow velocity. To characterize the flow of particles in the process, a plurality of FSMS 104 may be arranged circumferentially around the process to capture particles flowing in different circumferential and/or radial directions, e.g., away from the lathe, workpiece, atomization system, or the like.

Figure 3:
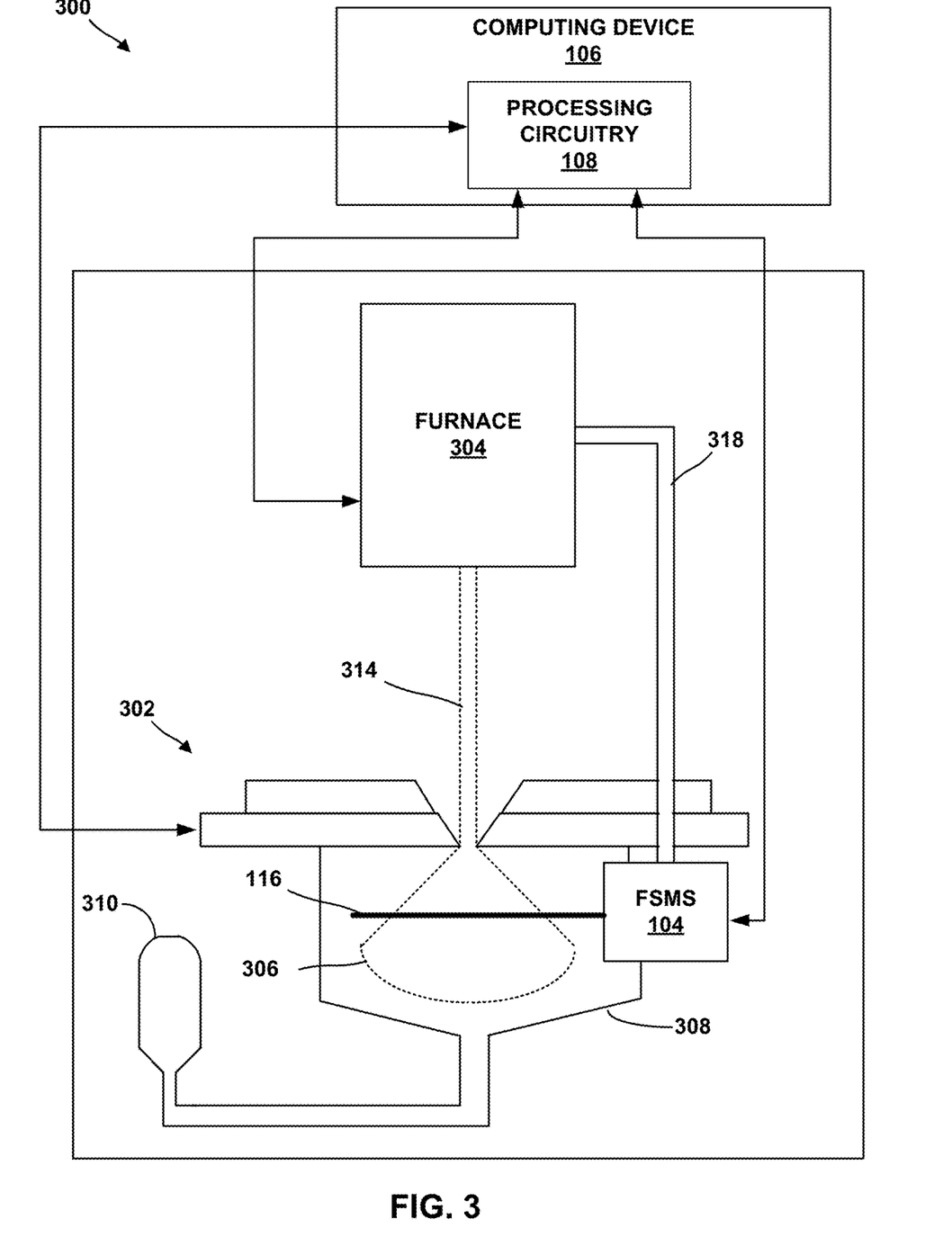
FIG. 3 is a conceptual block diagram illustrating an example powder manufacturing system that includes a plurality of fluid stream monitoring systems configured to monitor particle flow between a fluid stream delivery device and a target surface.

As mentioned above, in some implementations, a FSMS may be used to monitor particle production in a powder manufacturing system. FIG. 3 shows an example powder manufacturing system 300 with a FSMS 104 used to monitor the manufactured powder stream for use with a powder manufacturing system. The various components of the powder manufacturing system 200 including, for example, z-stage 318, computing device 106, and the like may be substantially similar to the components of example system 100 described above, apart from any differences described below.

During an example powder manufacturing process as illustrated in FIG. 3, metals such as aluminum are melted in the furnace 304 and directed towards atomizer 302 in a liquid (or molten) stream 306. Once the liquid stream 306 passes stage 302, it is atomized by impinging high velocity gases, producing a powder stream 308 containing powders suspended in the gases. That gases may comprise one or more gases that are inert to the material from which the particles are formed, such as helium or argon. The powder stream 308 is contained in a chamber 310. The powder stream 308 may then be directed to a separator 312 which isolates the manufactured powder from the gases and other particles within powder stream 308. The example powder manufacturing system 300 may be configured for any gas atomization process (e.g., gas atomization process with free-fall design, gas atomization process with continued nozzle design, or the like).

In the example illustrated in FIG. 3, the FSMS 104 is directed to monitor powder stream 308. While image plane 116 is shown to be substantially horizontal, image plane 116 may be manipulated using z-stage 118 to image powder stream 308 at other locations and/or in other orientations.

Figure 4:
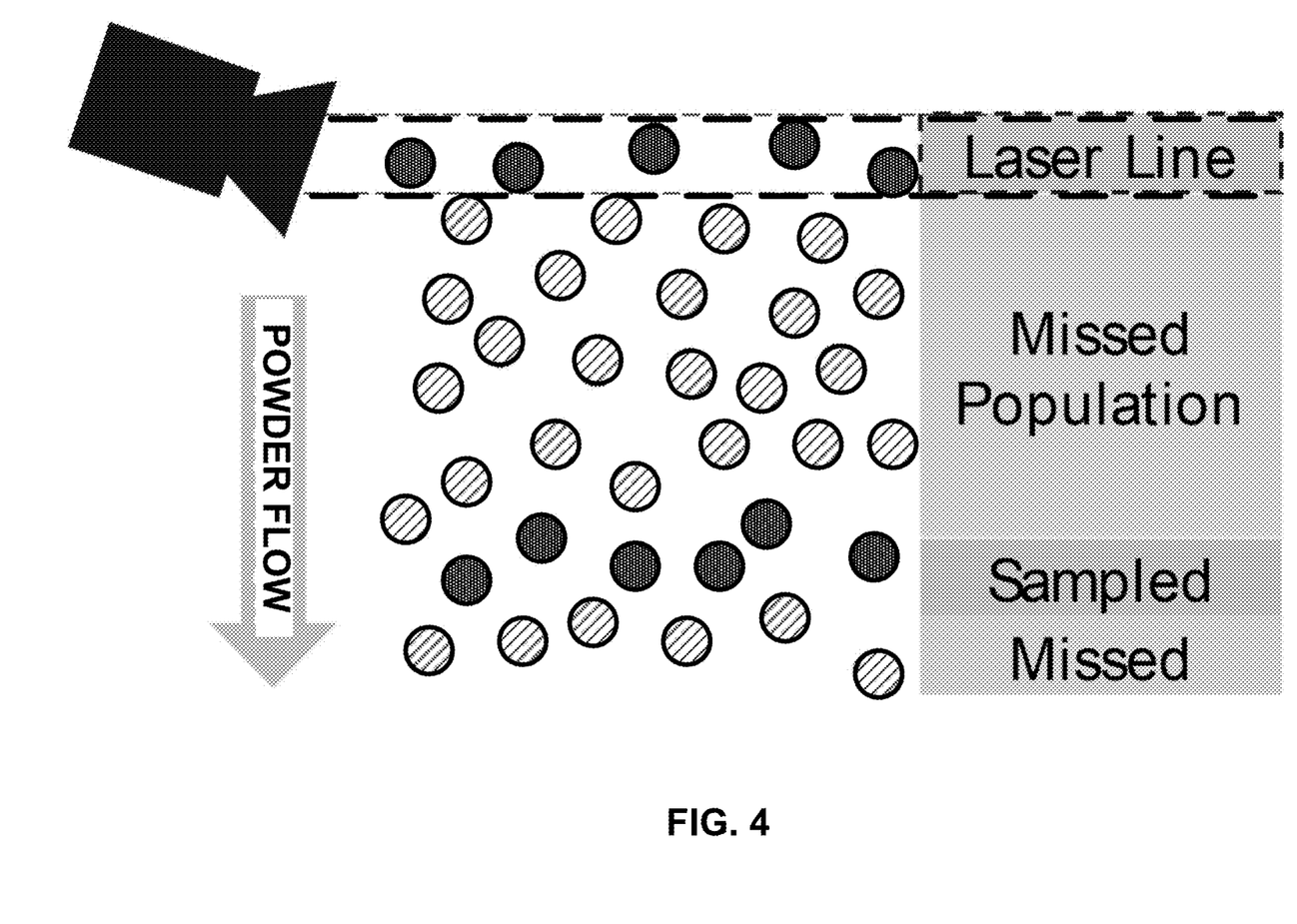
FIG. 4 is a conceptual diagram illustrating an example of portions of particles of a fluid stream imaged by a fluid stream monitoring system.

As shown in FIG. 4, since the particles are flowing in fluid stream 114 at a relatively high velocity, imaging device 212 may not capture images of all the particles in fluid stream 114. The fraction of particle that imaging device 212 may not capture images of may be a function of average particle velocity at the image plane 116 and a frame rate or capture speed of imaging device 212. This is represented in FIG. 4 as "sampled" particles and "missed population" particles. The fraction of particles imaged by imaging device 212 may, in some examples, by less than about 50%, less than about 40%, less than about 30%, less than about 25%, less than about 20%, or less than about 15%.

FSMS 104 may include or be connected to a computing device (e.g., computing device 106 of FIG. 1) configured to analyze images captured by imaging device 212 to identify a number of particle detections in each captured image and derive further parameters from the number of particle detections. As such, computing device 106 may be configured to receive image data representing an image captured by imaging device 212. The image data may include representations of illuminated particles of fluid stream 114, as imaged by imaging device 212 (e.g., as captured in an image frame by imaging device 212). Computing device 106 may be configured to generate a representation of fluid stream 114 based on the image data and output the representation of the fluid stream 114 for display at a display device.

For instance, computing device 106 may be configured to determine a particle mass flow represented by the image data. To do so, computing device 106 may be configured to identify a number of particles within each image frame. In some examples, computing device 106 additionally may be configured to identify a size and/or shape of each particle within each frame Computing device 106 may be configured to implement any suitable image analysis to identify particles, and optionally, size and/or shape of particles.

Once computing device 106 has identified a number of particles within an image frame, computing device 106 may be configured to determine a mass flow based on the number of powder particles. For example, computing device 106 may be configured to determine the mass flow based on a calibration equation or calibration curve. The relationship between particle detection and mass flow may be determined for each particle type (e.g., composition, size distribution, mass distribution).

In some examples, certain industrial manufacturing techniques and/or other applications (e.g., fuel nozzle spraying, waterjet cutting, paint spraying, or the like), may require the use of refractive particles (e.g., liquids). Computing device 106 may be configured to improve the detection of refractive particles, such as through higher illumination, improved image analysis techniques, and/or more frequent image capture.

In some examples, computing device 106 may receive image data representative of a sequence of images of illuminated particles in fluid stream 114. Each image may be associated with a time. As such, computing device 106 may select one or more images of the sequence of images and analyze the one or more images. Alternatively, computing device 106 may analyze the sequence of images together (e.g., synchronize the images in time to characterize different parts of the fluid stream 114).

Computing device 106 may be configured to generate a representation of the fluid stream 114 based on the image data. The representation may be a number, such as a number of detections, a detection rate, a mass flow, a mass flow rate, or the like. Alternatively, or additionally, the representation may be a user interface screen that graphically represents the fluid stream 114. In some examples, the user interface screen may graphically represent at least some of the imaged particles. For example, the user interface screen may graphically represent the physical morphology of some of the imaged particles.

Figure 5:
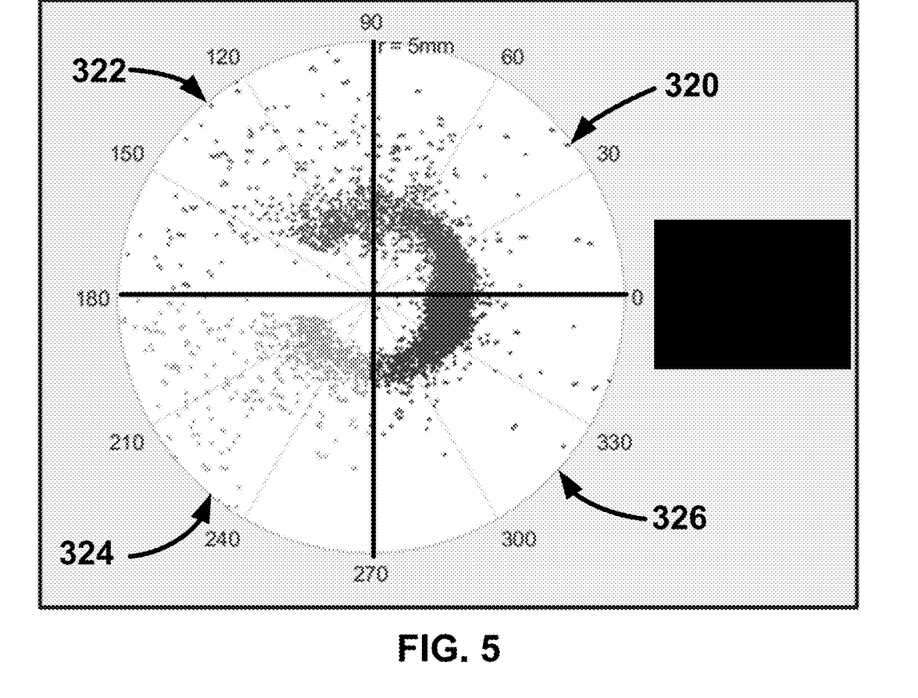
FIG. 5 is an example plot of particle detections in an image plane plotted in polar coordinates.

In some examples, representing a shape of the fluid stream 114 based on particle detections may be used to detect a clog within the system or damage to a component of the system. For example, FIG. 5 is an example plot of particle detections in an image plane plotted in polar coordinates. The polar coordinates are divided into four quadrants, each quadrant corresponding to a 90-degree sector. First quadrant 320 extends from 0 to 90 degrees, second quadrant 322 extends from 90 to 180 degrees, third quadrant 324 extends from 180 degrees to 270 degrees, and fourth quadrant 326 extends from 270 degrees to 0 degrees. As shown in FIG. 5, the particle distribution is asymmetric. Near the boundary of second quadrant 322 and third quadrant 324 (between about 145 degrees and 190 degrees), the particle distribution is low, while near the boundary of fourth quadrant 326 and first quadrant 320 (about 330 to 30 degrees), the powder distribution is high. This may indicate a clog within a nozzle directing particles to between 145 degrees and 190 degrees or may indicate damage to a nozzle directing particles to between about 330 to 30 degrees, or both, such that the resulting particle flow in the fluid stream 114 is asymmetric.

Figure 6:
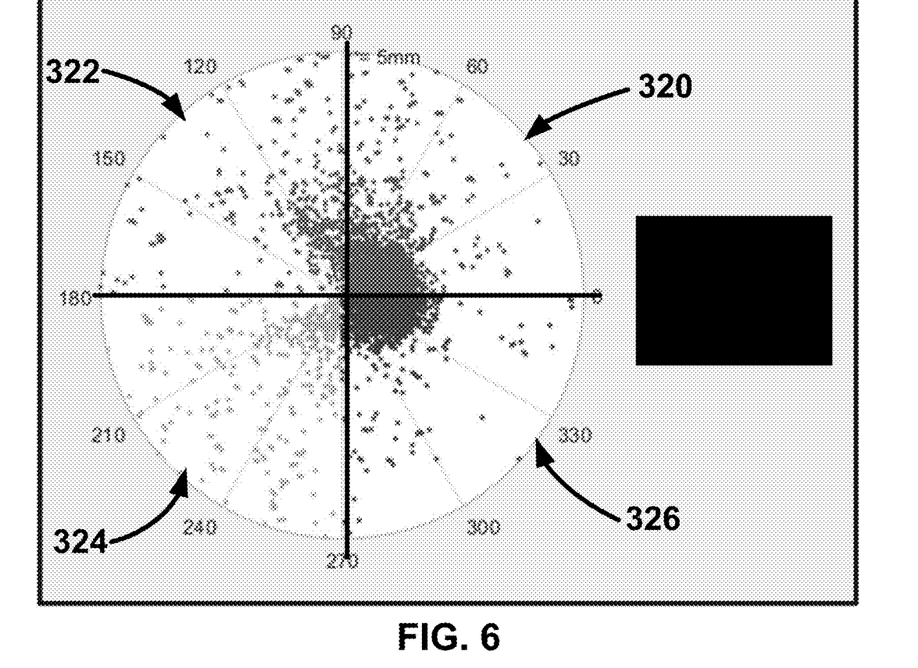
FIG. 6 is an example plot of particle detections in an image plane plotted in polar coordinates.

FIG. 6 is an example plot of particle detections in an image plane plotted in polar coordinates. The data shown in FIG. 6 is from the same fluid stream 114 as shown in FIG. 5, but at a different axial position along fluid stream 114.

FIG. 6 similarly shows a low particle distribution in second quadrant 322 and third quadrant 324, and a high particle distribution in first quadrant 320 and third quadrant 326. Together, FIGS. 5 and 6 may indicate a clog within a nozzle directing particles to between 145 degrees and 190 degrees, or may indicate damage to a nozzle directing powder to between about 330 and 30 degrees, or both, such that the resulting particle flow in the fluid stream 114 is asymmetric.

Figure 7:
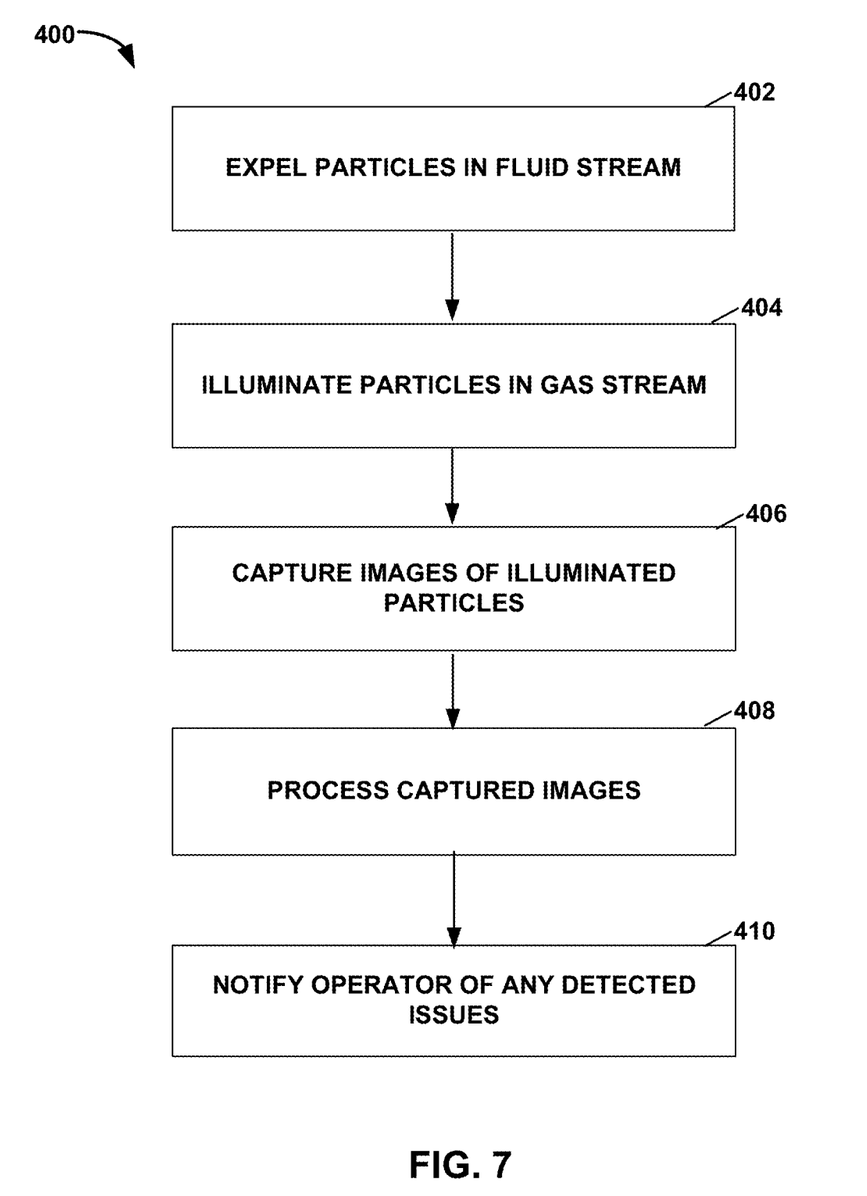
FIG. 7 is a flow diagram illustrating an example technique for controlling a manufacturing system based on data collected using a fluid stream monitoring system.

FIG. 7 illustrates an example method 400 of monitoring fluid stream 114 for the industrial manufacturing techniques disclosed herein including ablative blasting, shot peening, cold spraying, plasma spraying, paint spraying, waterjet cutting, or the application of machining fluid to a machining tool. The technique of FIG. 7 will be described with concurrent reference to system 100 of FIG. 1. However, system 100 of FIG. 1 may be used to perform other techniques, and the technique of FIG. 7 may be performed using other systems.

Computing device 106 may control FSMS 104 to illuminate particles in the fluid stream 114 (404), control FSMS 104 to capture images of the illuminated particles (406), process the captured images (408), and output information based on the processed images (410).

As described above, FSMS 104 is used to monitor a fluid stream. In some examples, the fluid stream is output by a fluid stream delivery device 102. In other example, the fluid stream is generated by a process which FSMS 104 is being used to monitor. As fluid stream containing particles (e.g., fluid stream 114) is expelled (402). In some implementations, computing device 106 may control fluid stream delivery device 102 to output the particles in a fluid stream 112.

In some examples, the particles may be solid particles such as glass, steel, plastics, copper, sand, ceramics, or any other media commonly used in the industrial manufacturing processes disclosed herein (e.g., for use in abrasive blasting or shot peening or cold spraying). The size of the solid particles may vary based on the industrial manufacturing technique that is used. For example, particles for use in an abrasive blasting technique may range from around 70 microns to around 900 microns. In other examples, particles for use in a shot peening technique may range from around 0.3 mm to around 0.8 mm. In another example, particles for use in a cold spray coating techniques may range from 0.001 mm to 0.05 mm. In another example, particles for use in thermal spray coating techniques may range from 0.010 mm to 0.200 mm.

In some examples, the thermal spray coating techniques may apply heat to particles prior to, during, and/or after particles enter image plane 116. In some examples, particles used in thermal spray coating techniques may be completely liquified when the particles enter image plane 116. In other examples, particles used in thermal spray coating techniques may be partially liquified when the particles impact target surface 110.

In other examples, the particles may be liquid particles such as machining fluid, melted metals, water, paint, fuel, or any other liquid media commonly used in the industrial manufacturing processes disclosed herein (e.g., for use in thermal spray coating).

Computing device 106 may control FSMS 104 to illuminates particles crossing an image plane 116 (404). FSMS 104 may use an illumination device (e.g., illumination device 212 of FIG. 2) to illuminate the particles suspended in fluid stream 110. FSMS 104 may illuminate the particles using a laser or another similar device. In some examples, the illumination device may only operate in short bursts to illuminate the particles. In other examples, the illumination device may constantly illuminate the particles.

After the particles in the fluid stream are illuminated (404), FSMS 104 then captures images of the illuminated particles (406). The FSMS 104 may use an imaging device (e.g., imaging device 214 of FIG. 2) to capture images of the illuminated particles at the image plane (406). The imaging device may be a high-speed camera operating at around 1,000 Hz or higher. In some examples, the illuminated particles in some applications may travel at higher speeds than in other applications. An imaging device with a higher capture rate may be used for particles with high velocities. In other examples, multiple FSMS 104 may be used to improve capture rate of the illuminated particles, cover more areas of the fluid stream(s), or the like.

In some examples, the particles (e.g., water, fuel) may have refractory properties that makes image capture and/or image processing relatively more difficult (e.g., compared to solid particles). FSMS may be calibrated for use with a specific media. In other examples, FSMS may incorporate a stronger illumination source such as a more powerful laser to account for the refractory properties of the particles. In other examples, the industrial manufacturing technique (e.g., plasma spray coating) may require additional features to improve capture of images, such as filtering out certain wavelengths to prevent image washout.

While the example technique of FIG. 7 describes a single FSMS illuminating and imaging the particles suspended in the fluid stream, other example methods may use multiple FSMS to illuminate and image the particles, either at the same image plane and/or orientation or at different image planes and/or orientations.

Once images of the illuminated particles are captured (406), computing device 106 then processes the images (408). Image processing may be done on one or more devices (e.g., computing device 106), through one or more systems (e.g., system 100), or the like. Image processing may include, for instance, determining, by computing devices 106, at least one metric associated with fluid stream 110 based on the image data. In some examples, the at least one metric includes a mass flow rate or a powder distribution within powder stream 110. The at least one metric may be associated with a single image frame or a series of image frames and may be associated with an entire image frame or a region of interest within an image frame. For instance, the at least one metric may include a plurality of metrics: powder detections from one or more image frames within a plurality of regions of interest. As another example, the at least one metric may include one or more corresponding powder distribution parameter within a sector (e.g., quadrant) of a polar coordinate system.

The at least one metric may be indicative of one or more property of fluid stream 110, including, for example, powder mass flux for fluid stream 110, powder mass flux for a region of interest of fluid stream 110, wear or damage to one or more nozzles that outputs fluid stream 110, powder distribution within fluid stream 110, clogging of one or more nozzles that outputs fluid stream 110, flow of the carrier gas in which particles are entrained, flow of a purge gas, or the like.

In some implementations, during image processing, computing device 106 may determine one or more physical properties of at least some of the particles may be determined. The physical properties may include velocity, mass, morphology (e.g., size and/or shape), or the like.

Once image processing is completed (408), computing device 106 may output information based on the processed images (410). For instance, computing device 106 may output a representation of the fluid stream 110 in any one or more of a variety of formats. For example, the computing device may be configured to output a number representing the detections or mass flow (e.g., a numerical mass flow rate in, for example, milligrams per minute or other appropriate units), a graphical representations of detections per unit time or mass flow per unit time, a graphical representation of detections or mass flow as a function of position (e.g., axial position and/or position within the image plane), or the like.

Additionally, or alternatively, computing device 106 may be configured to determine one or more fluid stream delivery system characteristics based on the images. For instance, based on the particle distribution, computing device 106 may be configured to identify a damaged nozzle, a clog within a nozzle, or the like.

In some examples, computing device 106 may automatically notify one or more operators or other authorized personnel of any detected issues. The systems of devices may determine that there is a detected issue if the image processing results deviated from accepted and/or expected results by a certain amount. For example, computing device 106 may determine that there is a detected issue if the uniformity of particle distribution within the fluid stream drops below a certain threshold percentage. In another example, computing device 106 may determine that there is a detected issue if the average particle morphology deviated from an expected average particle morphology by a certain percentage.

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components.

The techniques described in this disclosure may also be embodied or encoded in an article of manufacture including a computer-readable storage medium encoded with instructions. Instructions embedded or encoded in an article of manufacture including a computer-readable storage medium encoded, may cause one or more programmable processors, or other processors, to implement one or more of the techniques described herein, such as when instructions included or encoded in an article of manufacture including a computer-readable storage medium encoded, may cause one or more programmable processors, or other processors, to implement one or more of the techniques described herein, such as when instructions included or encoded in the computer-readable storage medium re executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable media. In some examples, an article of manufacture may include one or more computer-readable storage media.

In some examples, a computer-readable storage medium may include a non-transitory medium. The term "non-transitory" may indicate that the storage medium is not embodied in a carrier wave or a propagated signal. In certain examples, a non-transitory storage medium may store data that can, over time, change (e.g., in RAM or cache).

Various examples have been described. These and other examples are within the scope of the following numbered examples and claims.

Example 1: A system comprising: a fluid system monitoring system comprising: an illumination device configured to illuminate at least some of the particles suspended in a fluid stream; and an imaging device configured to image the illuminated particles at a first image plane that intersects a longitudinal axis of the fluid stream, wherein the illumination device and the imaging device are registered to the fluid stream delivery device in the first image plane, where the first image plane is substantially orthogonal to the longitudinal axis; and processing circuitry configured to determine one or more physical characteristics of the fluid particles.

Example 2: the system of example 1, further comprising: a fluid stream delivery device configured to expel the fluid stream onto a target surface.

Example 3: the system of examples 1 or 2, wherein the one or more physical characteristics of the image particles comprise a dispersion pattern of the imaged particles within the fluid stream.

Example 4: the system of any of examples 1-3, wherein the one or more physical characteristics of the imaged particles comprise the morphology of at least some of the imaged particles.

Example 5: the system of any of examples 1-4, wherein the illumination device and the imaging device are carried by an adjustable z-stage configured to move the illumination device and the imaging device parallel to the longitudinal axis relative to the fluid stream delivery device.

Example 6: the system of example 5, wherein moving the illumination device and the imaging device parallel to the longitudinal axis relative to the fluid system delivery device moves the first image plane parallel to the longitudinal axis relative to the fluid stream.

Example 7: the system of any of examples 1-6, wherein the illumination device comprises a laser configured to deliver a plane of light having a width sufficient to illuminate an entire width of the fluid stream.

Example 8: the system of any of examples 1-7, wherein the imaging device comprises a high speed camera with a frame rate of at least 1000 frames per second.

Example 9: the system of any of examples 1-8, wherein the fluid stream delivery device is configured to expel the fluid stream onto the target surface to create a coating comprising the particles over the target surface.

Example 10: the system of any of examples 1-9, wherein the fluid stream delivery device is configured to expel the fluid stream onto the target surface to alter one or more physical characteristics of the target surface, and wherein the one or more physical characteristics comprises one or more of a roughness, a thickness, a cleanliness, or a stress level of the target surface.

Example 11: the system of any of examples 1-10, wherein the particles suspended in the fluid stream are at least partially liquified, and wherein the fluid stream is a gas.

Example 12: the system of any of examples 1-10, wherein the particles suspended in the fluid stream are solids.

Example 13: the system of any of examples 1-12, further comprising one or more second illumination devices and one or more corresponding second imaging devices, wherein the second illumination devices and the second image device are registered in a second image plane substantially parallel to the first image plane.

Example 14: the system of example 13, wherein the one or more second illumination devices and the one or more corresponding second imaging devices are arranged in series with the illuminations device and the imaging device.

Example 15: the system of any of examples 1-14, further comprising a powder manufacturing system configured to create a powder by performing an atomization process on the fluid stream.

Example 16: the system of example 15, wherein the illumination device is further configured to illuminate at least some of the powder created by the powder manufacturing system, wherein the imaging device is further configured to image the illuminated powder at a third image plane substantially parallel to the first image plane, and wherein the processing circuitry is further configured to determine one or more physical characteristics of the image powder.

Example 17: a method comprising: illuminating, using an illumination device of a fluid stream monitoring system, at least some particles suspended in a fluid stream; imaging, using an imaging device of the fluid stream monitoring system, the illuminated particles at a first image plane that intersects a longitudinal axis of the fluid stream, wherein the illumination device and the imaging device are registered to the fluid stream delivery device in the first image plane, where the first image plane is substantially orthogonal to the longitudinal axis; and determining, using processing circuitry, one or more physical characteristics of the imaged particles.

Example 18: the method of example 17, wherein the one or more physical characteristics of the image particles comprise a dispersion pattern of the imaged particles within the fluid stream.

Example 19: the method of examples 17 or 18, wherein the one or more physical characteristics comprise a morphology of the imaged particles.

Example 20: the method of any of examples 17-19, wherein the illumination device and the imaging device are carried by an adjustable z-stage configured to move the illumination device and imaging device parallel to the longitudinal axis relative to the fluid stream delivery device.

Example 21: the method of example 20, further comprising moving, using the adjustable z-stage, the illumination device and the imaging device parallel to the longitudinal axis relative to the fluid stream delivery device and moving the first image plane parallel to the longitudinal axis relative to the fluid stream.

Example 22: the method of any of examples 17-21, wherein the illumination device comprises a laser configured to delivery a plane of light having a width sufficient to illuminate an entire width of the fluid stream.

Example 23: the method of any of examples 17-22, wherein the imaging device comprises a high speed camera with a frame rate of at least 1000 frames per second.

Example 24: the method of any of examples 17-23, wherein expelling, using the fluid stream delivery device, a fluid stream onto a target surface comprises creating a coating comprising the particles over the target surface.

Example 25: the method of any of examples 17-24, wherein expelling, using the fluid stream delivery device, a fluid onto a target surface alters one or more physical characteristics of the target surface, and wherein the one or more physical characteristics comprises one or more of a roughness, a thickness, a cleanliness, or a stress level of the target surface.

Example 26: the method of any of examples 17-25, wherein the particles suspended in the fluid stream are solids.

Example 27: the method of any of examples 17-26, wherein the particles suspended in the fluid stream are liquids, and wherein the fluid stream is a gas.

Example 28: the method of any of examples 17-27, further comprising: illuminating, using one or more second illumination devices, at least some of the particles suspended in the fluid stream between the fluid stream delivery device and the target surface; and imaging, using one or more corresponding second imaging device, the illuminated particles at an image plane that intersects the longitudinal axis, wherein the illumination device and the imaging device are registered to the fluid stream delivery device in a second image plane substantially parallel to the first image plane.

Example 29: the method of any of examples 17-28, further comprising: creating, using a powder manufacturing system, a powder by performing an atomization process on the fluid stream.

Example 30: the method of any of examples 17-29, further comprising: illuminating, using the illumination device, at least some of the powder created by the powder manufacturing system; imaging, using the imaging device, at least some of the illuminated powder at a third image plane substantially parallel to the first image plane; and determining, using the processing circuitry, one or more physical characteristics of the imaged powder.

Example 31: a non-transitory computer readable medium comprising instructions that, when executed, cause processing circuitry of a system to: illuminate, using an illumination device of a fluid stream monitoring system, at least some particles suspended in a fluid stream; image, using an imaging device of the fluid stream monitoring system, the illuminated particles at a first image plane that intersects a longitudinal axis of the fluid stream, wherein the illumination device and the imaging device are registered to the fluid stream delivery device in the first image plane, where the first image plane is substantially orthogonal to the longitudinal axis; and determine one or more physical characteristics of the imaged particles.

Example 32: a non-transitory computer readable medium comprising instructions that, when executed, cause processing circuitry of a system to perform the method of any of examples 17-30.

What is claimed is:

1. A system comprising:

a fluid stream monitoring system comprising:

an illumination device configured to illuminate at least some of particles suspended in a fluid stream; and an imaging device configured to image the illuminated particles at a first image plane that intersects a longitudinal axis of the fluid stream, wherein the illumination device and the imaging device are registered to the fluid stream delivery device in the first image plane, where the first image plane is substantially orthogonal to the longitudinal axis; and processing circuitry configured to determine one or more physical characteristics of the fluid particles.

2. The system of claim 1, wherein the one or more physical characteristics of the image particles comprise a dispersion pattern of the imaged particles within the fluid stream.

3. The system of claim 1, wherein the one or more physical characteristics of the imaged particles comprise the morphology of at least some of the imaged particles.

4. The system of claim 1, where the illumination device and the imaging device are carried by an adjustable z-stage configured to move the illumination device and the imaging device parallel to the longitudinal axis relative to the fluid stream delivery device.

5. The system of claim 1, wherein the fluid stream delivery device is configured to expel the fluid stream onto the target surface to create a coating comprising the particles over the target surface.

6. The system of claim 1, wherein the fluid stream delivery device is configured to expel the fluid stream onto a target surface to alter one or more physical characteristics of the target surface, and wherein the one or more physical characteristics comprise one or more of a roughness, a thickness, a cleanliness, or a stress level of the target surface.

7. The system of claim 1, wherein the particles suspended in the fluid stream are at least partially liquified, and wherein the fluid stream is a gas.

8. The system of claim 1, further comprising one or more second illuminations devices and one or more corresponding second imaging devices, wherein the second illuminations device and the second imaging device are registered in a second image plane substantially parallel to the first image plane.

9. The system of claim 1, further comprising a powder manufacturing system configured to create a powder by performing an atomization process on the fluid stream.

10. The system of claim 9, wherein the illumination device is further configured to illuminate at least some of the powder created by the powder manufacturing system, wherein the imaging device is further configured to image the illuminated powder at a third image plane substantially parallel to the first image plane, and wherein the processing circuitry is further configured to determine one or more physical characteristics of the imaged powder.

11. A method comprising:

illuminating, using an illumination device of a fluid stream monitoring system, at least some particles suspended in a fluid stream;

imaging, using an imaging device of the fluid stream monitoring system, the illuminated particles at a first image plane that intersects a longitudinal axis of the fluid stream, wherein the illumination device and the imaging device are registered to the fluid stream delivery device in the first image plane, where the first image plane is substantially orthogonal to the longitudinal axis; and determining, using processing circuitry, one or more physical characteristics of the imaged particles.

12. The method of claim 11, wherein the one or more physical characteristics of the image particles comprise a dispersion pattern of the imaged particles within the fluid stream.

13. The method of claim 11, wherein the one or more physical characteristics comprise a morphology of the imaged particles.

14. The method of claim 11, wherein the illumination device and the imaging device are carried by an adjustable z-stage configured to move the illumination device and imaging device parallel to the longitudinal axis relative to the fluid stream delivery device.

15. The method of claim 11, wherein expelling, using the fluid stream delivery device, a fluid stream onto a target surface comprises creating a coating comprising the particles over the target surface.

16. The method of claim 11, wherein expelling, using the fluid stream delivery device, a fluid onto a target surface alters one or more physical characteristics of the target surface, and wherein the one or more physical characteristics comprise one or more of a roughness, a thickness, a cleanliness, or a stress level of the target surface.

17. The method of claim 11, wherein the particles suspended in the fluid stream are liquids, and wherein the fluid stream is a gas.

18. The method of claim 11, further comprising:

illuminating, using one or more second illumination devices, at least some of the particles suspended in the fluid stream between the fluid stream delivery device and the target surface; and imaging, using one or more corresponding second imaging devices, the illuminated particles at an image plane that intersects the longitudinal axis, wherein the illumination device and the imaging device are registered to the fluid stream delivery device in a second image plane substantially parallel to the first image plane.

19. The method of claim 18, further comprising:

creating, using a powder manufacturing system, a powder by performing an atomization process on the fluid stream.

20. A non-transitory computer readable medium comprising instructions that, when executed, cause processing circuitry of a system to:

illuminate, using an illumination device of a fluid stream monitoring system, at least some particles suspended in a fluid stream;

image, using an imaging device of the fluid stream monitoring system, the illuminated particles at a first image plane that intersects a longitudinal axis of the fluid stream, wherein the illumination device and the imaging device are registered to the fluid stream delivery device in the first image plane, where the first image plane is substantially orthogonal to the longitudinal axis; and determine one or more physical characteristics of the imaged particles.

* * * * *